US008957125B2

(12) United States Patent
Belt et al.

(10) Patent No.: US 8,957,125 B2
(45) Date of Patent: Feb. 17, 2015

(54) COATING FORMULATION FOR PREPARING A HYDROPHILIC COATING

(75) Inventors: Johannes Wilhelmus Belt, Echt (NL); Johannes Bronislaw Wolf, Selfkant (DE)

(73) Assignee: DSM IP Assets B.V., Heerlen (NL)

( * ) Notice: Subject to any disclaimer, the term of this patent is extended or adjusted under 35 U.S.C. 154(b) by 123 days.

(21) Appl. No.: 13/704,714

(22) PCT Filed: Jun. 16, 2011

(86) PCT No.: PCT/EP2011/060066
§ 371 (c)(1),
(2), (4) Date: Feb. 28, 2013

(87) PCT Pub. No.: WO2011/157805
PCT Pub. Date: Dec. 22, 2011

(65) Prior Publication Data
US 2013/0202833 A1  Aug. 8, 2013

Related U.S. Application Data

(60) Provisional application No. 61/355,707, filed on Jun. 17, 2010.

(30) Foreign Application Priority Data

Jun. 16, 2010  (EP) .................................. 10166133

(51) Int. Cl.
C08F 2/50 (2006.01)
C09D 139/06 (2006.01)
C09D 201/00 (2006.01)
C09D 133/26 (2006.01)
C10M 129/20 (2006.01)
C10M 129/24 (2006.01)
C10M 135/34 (2006.01)
C08K 5/00 (2006.01)

(52) U.S. Cl.
CPC ............ C09D 139/06 (2013.01); C09D 201/00 (2013.01); C09D 133/26 (2013.01); C10M 129/20 (2013.01); C10M 129/24 (2013.01); C10M 135/34 (2013.01); C08K 5/0025 (2013.01)
USPC .................. 522/46; 522/48; 522/53; 522/68; 522/33; 428/36.91; 428/522; 428/394; 508/578; 508/301; 508/307; 508/100; 427/517

(58) Field of Classification Search
CPC .......... B29D 22/00; B29D 23/00; C08K 5/00; C09D 201/00; C09D 139/06; C09D 133/26; C10M 129/20; C10M 129/24; C10M 135/34
USPC ............... 428/36.91, 522, 394; 508/578, 301, 508/307, 100; 522/46, 48, 53, 68, 33; 427/517
See application file for complete search history.

(56) References Cited

U.S. PATENT DOCUMENTS

| 4,105,519 A | 8/1978 | Pennewiss et al. |
| 4,111,922 A | 9/1978 | Beede et al. |
| 4,117,184 A | 9/1978 | Erickson et al. |
| 4,272,620 A | 6/1981 | Ichimura |
| 4,612,336 A | 9/1986 | Yada et al. |
| 4,818,325 A | 4/1989 | Hiraiwa et al. |
| 4,874,822 A | 10/1989 | Rasmussen et al. |
| 5,005,287 A | 4/1991 | Ritter |
| 5,008,301 A | 4/1991 | Dennis et al. |
| 5,077,352 A | 12/1991 | Elton |
| 5,084,315 A | 1/1992 | Karimi et al. |
| 5,091,205 A | 2/1992 | Fan |
| 5,135,516 A | 8/1992 | Sahatjian et al. |
| 5,317,063 A | 5/1994 | Komatsu et al. |
| 5,670,557 A | 9/1997 | Dietz |
| 5,700,559 A | 12/1997 | Sheu et al. |
| 5,702,754 A | 12/1997 | Zhong |
| 5,756,144 A | 5/1998 | Wolff et al. |
| 5,804,318 A | 9/1998 | Pinchuk et al. |
| 5,985,990 A | 11/1999 | Kantner et al. |
| 5,994,419 A | 11/1999 | Collette et al. |
| 6,048,620 A | 4/2000 | Zhong |

(Continued)

FOREIGN PATENT DOCUMENTS

| EP | 0 289 996 | 11/1988 |
| EP | 0 405 464 | 1/1991 |

(Continued)

OTHER PUBLICATIONS

Alt, V. et al., "Plasma Polymer Coating with High-Porosity Silver for Antimicrobial Protection of Osteosynthetic Devices," Osteosynthese International 2005—Kongress, Oral Presentation, No. 075, Sep. 15, 2005, 1 page.
Asha, S.K. et al., "Synthesis and Curing Studies of PPG Based Telechelic Urethane Methacrylic Macromonomers," European Polymer Journal, vol. 41. No. 1, Jan. 2005, pp. 23-33.
Guggenbichler, J.P. et al., "A New Technology of Microdispersed Silver in Polyurethane induces Antimicrobial Activity in Central Venous Catheters," Infection, vol. 27, Suppl. I, pp. S16-S23, 1999.
Samuel, U. et al., "Prevention of Catheter-Related Infections: the Potential of a New Nano-Silver Impregnated Catheter." Interntional Journal of Antimicrobial Agents. vol. 23, Suppl. 1, pp. S75-S78, Mar. 2004.

(Continued)

Primary Examiner — Michael C Miggins
(74) Attorney, Agent, or Firm — Nixon & Vanderhye P.C.

(57) ABSTRACT

The invention is directed to a coating formulation for preparing a hydrophilic coating a hydrophilic polymer, a Norrish Type II photoinitiator, comprising a substituted benzohenone, xanthone, tioxanthone or anthraquinone, and more than 70 wt % of a carrier liquid; to a method of forming a hydrophilic coating on a substrate, the method comprising: applying a coating formulation to at least one surface of an article and allowing the coating formulation to cure for a time period less than 360 seconds; and to an article comprising at least one hydrophilic coating.

14 Claims, No Drawings

(56) References Cited

U.S. PATENT DOCUMENTS

| | | | |
|---|---|---|---|
| 6,110,451 A | 8/2000 | Matz et al. |
| 6,120,904 A | 9/2000 | Hostettler et al. |
| 6,221,425 B1 | 4/2001 | Michal et al. |
| 6,238,799 B1 | 5/2001 | Opolski |
| 6,310,116 B1 | 10/2001 | Yasuda et al. |
| 6,565,981 B1 | 5/2003 | Messner et al. |
| 6,589,665 B2 | 7/2003 | Chabrecek et al. |
| 6,673,053 B2 | 1/2004 | Wang et al. |
| 6,709,706 B2 | 3/2004 | Zhong et al. |
| 6,720,130 B1 | 4/2004 | Zhong et al. |
| 6,835,783 B1 | 12/2004 | Gartner et al. |
| 6,849,685 B2 | 2/2005 | Soerens et al. |
| 6,887,961 B2 | 5/2005 | Soerens et al. |
| 7,264,859 B2 | 9/2007 | Rouns et al. |
| 7,544,381 B2 | 6/2009 | Kangas |
| 8,133,580 B2 | 3/2012 | Dias et al. |
| 2001/0011165 A1 | 8/2001 | Engelson et al. |
| 2001/0027299 A1 | 10/2001 | Yang et al. |
| 2002/0002353 A1 | 1/2002 | Michal et al. |
| 2002/0013549 A1 | 1/2002 | Zhong et al. |
| 2003/0013615 A1 | 1/2003 | Levy |
| 2003/0096131 A1 | 5/2003 | Beavers et al. |
| 2004/0019168 A1 | 1/2004 | Soerens et al. |
| 2004/0043688 A1 | 3/2004 | Soerens et al. |
| 2004/0110861 A1 | 6/2004 | Shorbu et al. |
| 2004/0135967 A1 | 7/2004 | Carney et al. |
| 2004/0143180 A1 | 7/2004 | Zhong et al. |
| 2005/0054774 A1 | 3/2005 | Kangas |
| 2005/0080157 A1 | 4/2005 | Wagener et al. |
| 2005/0100580 A1 | 5/2005 | Osborne et al. |
| 2005/0170071 A1 | 8/2005 | Eramo |
| 2005/0191430 A1 | 9/2005 | Rubner et al. |
| 2006/0240060 A1 | 10/2006 | Bavaro |
| 2007/0167735 A1 | 7/2007 | Zhong et al. |
| 2008/0292776 A1 | 11/2008 | Dias et al. |
| 2008/0306455 A1 | 12/2008 | Dias et al. |
| 2009/0169715 A1 | 7/2009 | Dias et al. |
| 2010/0113871 A1 | 5/2010 | Dias et al. |
| 2010/0198168 A1 | 8/2010 | Rooijmans |
| 2011/0046255 A1 | 2/2011 | Rooijmans |
| 2011/0059874 A1 | 3/2011 | Rooijmans et al. |

FOREIGN PATENT DOCUMENTS

| | | |
|---|---|---|
| EP | 0 480 809 | 4/1992 |
| EP | 1 065 738 | 1/2001 |
| EP | 1 621 217 | 2/2006 |
| EP | 1 776 968 | 4/2007 |
| JP | S54-147696 | 11/1979 |
| JP | H04-144567 | 5/1992 |
| JP | H06-039347 | 2/1994 |
| JP | H10-211273 | 8/1998 |
| JP | H10-277144 | 10/1998 |
| JP | H11-172149 | 6/1999 |
| JP | 2001-000531 | 1/2001 |
| WO | WO 96/28762 | 9/1996 |
| WO | WO 97/17378 | 5/1997 |
| WO | WO 98/50461 | 11/1998 |
| WO | WO 98/58989 | 12/1998 |
| WO | WO 99/38546 | 8/1999 |
| WO | WO 01/51103 | 7/2001 |
| WO | WO 01/92584 | 12/2001 |
| WO | WO 2004/056909 | 7/2004 |
| WO | WO 2004/060427 | 7/2004 |
| WO | WO 2004/091685 | 10/2004 |
| WO | WO 2006/042514 | 4/2006 |
| WO | WO 2006/056482 | 6/2006 |
| WO | WO 2007/065722 | 6/2007 |
| WO | WO 2008/012325 | 1/2008 |
| WO | WO 2008/031596 | 3/2008 |
| WO | WO 2008/071796 | 6/2008 |
| WO | WO 2008/104573 | 8/2008 |
| WO | WO 2011/157805 | 12/2011 |

OTHER PUBLICATIONS

Database WPI Week 199517, *Thomas Scientific*, XP 002451204 & JP 07 053895, Feb. 28, 1995 Abstract.
International Search Report for PCT/EP2006/011902 dated Aug. 6, 2007.
Written Opinion of the International Searching Authority for PCT/EP2006/011902 dated Aug. 6, 2007.
International Search Report for PCT/EP2006/011903 dated Aug. 8, 2007.
Written Opinion of the International Searching Authority for PCT/EP2006/011903 dated Aug. 2007.
International Search Report for PCT/EP2006/011904 dated Mar. 16, 2007.
Written Opinion of the International Searching Authority for PCT/EP2006/011904 dated Mar. 16, 2007.
International Search Report for PCT/EP2007/007984, dated Apr. 11, 2008.
Written Opinion of the International Searching Authority for PCT/EP2007/007984, dated Apr. 11, 2008.
International Search Report for PCT/EP2007/007995 dated Feb. 27, 2008.
Written Opinion of the International Searching Authority for PCT/EP2007/007995 dated Feb. 27, 2008.
International Search Report for PCT/EP2008/052396 mailed Feb. 16, 2009.
Written Opinion of the International Searching Authority for PCT/EP2008/052396 mailed Feb. 16, 2009.
International Search Report for PCT/EP2008/052397 mailed Jan. 13, 2009.
International Search Report for PCT/EP2009/032918 mailed Jun. 22, 2009.
Written Opinion of the International Searching Authority for PCT/EP2009/052918 mailed Jun. 22, 2009.
Japanese Patent Office. Notice of Reasons for Rejection, P2008-543747, Dispatch No. 004257 (Jan. 10, 2012) (English Translation).
Japanese Patent Office, Final Rejection, P2008-543747, Dispatch No. 472881 (Jul. 17, 2012) (English Translation).
International Search Report for PCT/EP2011/060066, mailed Sep. 5, 2011.
Written Opinion for PCT/EP2011/060066, mailed Sep. 5, 2011.

COATING FORMULATION FOR PREPARING A HYDROPHILIC COATING

This application is the U.S. national phase of International Application No. PCT/EP2011/060066 filed 16 Jun. 2011 which designated the U.S. and claims priority to EP Patent Application No. 10166133.8 filed 16 Jun. 2010 and claims the benefit of U.S. Provisional Appln. No. 61/355,707, filed 17 Jun. 2010, the entire contents of each of which are hereby incorporated by reference.

The invention is directed to a coating formulation for preparing a hydrophilic coating, a method to apply the coating formulation to a surface, a lubricious coating obtainable by applying a wetting fluid to a hydrophilic coating and an article, in particular a medical device, comprising a hydrophilic or lubricious coating.

Many medical devices, such as guide wires, urinary and cardiovascular catheters, syringes, and membranes need to have a lubricant applied to the outer and/or inner surface to facilitate insertion of these medical devices into and removal from the body. The lubricants also facilitate drainage of fluids from the body. Lubricious properties are also required to minimize soft tissue damage upon insertion or removal. For lubrication purposes medical devices often contain a hydrophilic surface coating or layer which becomes lubricious and attains low-friction properties upon wetting, i.e. by applying a wetting fluid for a certain time period prior to insertion of the device into the body of a patient.

A coating or layer which becomes lubricious after wetting is hereinafter referred to as a hydrophilic coating. A coating obtained after wetting is hereinafter referred to as a lubricious coating.

In applications where a coating comes into contact with liquids, there is a desire to minimize the amount of migrateables. The term "migrateables" as used herein is recognized in the art to indicate molecules that may leak out of a particular matrix under particular circumstances. The term is synonymous with "extractables" or "extractable components" which terms are also frequently used in the art.

In coatings used in membranes and in films that are in contact with food the amount of migrateables should be as low as possible. The desire to minimize the amount of migrateables becomes extremely important when the coatings are used in medical devices that are used medical applications. Medical devices that come into close contact with the body or body fluids are, for instance, contact lenses, guide wires and catheters. The loss of one or more components from a coating may result in change in composition and functional properties of the coating as well as in contaminating the immediate host environment. Moreover, the migrateable component may be harmful when released into the environment of the coating, such as food, human body or body fluids.

The most common way to reduce the amount of migrateables from a coating is by crosslinking a coating formulation by curing. The term "to cure" includes any way of treating the formulation such that it forms a firm or solid coating whereby the ability of the dried coating components to dissolve again in a solvent is completely eliminated or strongly reduced. In particular, the term includes a treatment whereby the hydrophilic polymer crosslinks by a process called grafting wherein polymer chains are chemically connected under the influence of a reactive entity.

This can, for instance, be performed by adding photoinitiators to a coating formulation, which subsequently are activated by electromagnetic radiation after a coating formulation is applied on a substrate. A coating prepared in such way adheres to the surface well enough to resist mechanical or other abrasive forces applied to the surface and the amount of migrateables released from the coating is minimized.

Coating formulations comprising photoinitiators are, for instance, described in WO2006/056482 and WO2009/112548. In these patent publications the use of different types of photoinitiators is described for curing hydrophilic coating formulations.

It has now surprisingly been discovered that by using a special type of photoinitiators the curing time of a coating formulation can be significantly improved.

The invention is characterized by a coating formulation for preparing a hydrophilic coating comprising a hydrophilic polymer, a Norrish Type II photoinitiator, comprising a substituted benzohenone, xanthone, tioxanthone or anthraquinone, and more than 70 wt % of a carrier liquid.

The advantage of using the coating formulation according to the invention is that the cure speed of the coating formulation improves significantly. The hydrophilic coating can thus be applied on a substrate in a shorter amount of time. This results in a faster coating process which is economically attractive.

The coating formulation according to the invention comprises a Norrish type II photoinitiator. A type II photoinitiator induces crosslinking in case it is activated with electromagnetic radiation by hydrogen abstraction from a suitable synergist, which may be a low molecular weight compound or a polymer.

The substituents on the Norrish type II photoinitiator can be present on the 2, 3 and/or 4 position of the phenyl rings in the Norrish Type II photoinitiator, preferably on the 3 and/or 4 position of the phenyl rings. Examples of substituents are substituents comprising hydroxy, anhydride, acid, ester, ether, amine, amide and amino functional groups. Examples of Type II photoinitiators are 2-benzoyl benzoic acid, 3-benzoyl benzoic acid, 4-benzoyl benzoic acid, 3,3',4,4'-benzophenone tetracarboxilic acid, 4-benzoyl-N,N,N,-trimethylbenzene-methaminium chloride, 2-hydroxy-3-(4-benzoylphenoxy)-N,N,N-trimethyl-1-propanaminium chloride, 2-hydroxy-3-(3,4-dimethyl-9-oxo-9H-thioxanthon-2-yloxy)-N,N,N-trimethyl-1-propanaminium chloride, thioxanthone-3-carboxylic acid, thioxanthone-4-carboxylic acid, anthraquinone 2-sulfonic acid, 9,10-anthraquinone-2,6-disulphonic acid, anthraquinone-2-sulfonic acid, anthraquinone-2-carboxylic acid and salts of these derivatives such as the sodium-, potassium-, calcium-, magnesium, iron-, copper and zinc salts.

Norrish Type II photoinitiators that bear more than one substituent can also be used.

Also mixtures of Norrish Type II photoinitiators can be used.

The cure speed of the coating formulation can be further improved if the coating formulation also comprises a Norrish type I photo initiator.

In such a coating formulation both the Norrish Type II photoinitiators and Norrish Type I photoinitiators are free-radical photoinitiators, but are distinguished by the process by which the initiating radicals are formed.

Compounds that undergo unimolecular bond cleavage of the chromophore upon irradiation to generate radicals that initiate polymerization are termed Norrish Type I or homolytic photoinitiators. The Norrish Type II photoinitiators generate radicals indirectly by hydrogen abstraction from a suitable synergist, which may be a low molecular weight compound or a polymer.

Compounds that undergo unimolecular bond cleavage upon irradiation are termed Norrish Type I or homolytic photoinitiators, as shown by formula (1):

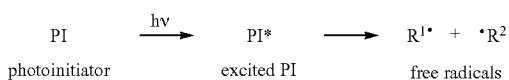

(1)

Depending on the nature of the functional group and its location in the molecule relative to the carbonyl group, the fragmentation can take place at a bond adjacent to the carbonyl group (α-cleavage), at a bond in the β-position (β-cleavage) or, in the case of particularly weak bonds (like C—S bonds or O—O bonds), elsewhere at a remote position. The most important fragmentation in photoinitiator molecules is the α-cleavage of the carbon-carbon bond between the carbonyl group and the alkyl residue in alkyl aryl ketones, which is known as the Norrish Type I reaction.

Examples of suitable Norrish Type I or free-radical photoinitiators are benzoin derivatives, methylolbenzoin and 4-benzoyl-1,3-dioxolane derivatives, benzilketals, α,α-dialkoxyacetophenones, α-hydroxy alkylphenones, α-aminoalkylphenones, acylphosphine oxides, bisacylphosphine oxides, acylphosphine sulphides, halogenated acetophenone derivatives, and the like. Commercial examples of suitable Type I photoinitiators are Irgacure 2959 (2-hydroxy-4'-(2-hydroxyethoxy)-2-methyl propiophenone), Irgacure 651 (benzildimethyl ketal or 2,2-dimethoxy-1,2-diphenylethanone, Ciba-Geigy), Irgacure 184 (1-hydroxy-cyclohexyl-phenyl ketone as the active component, Ciba-Geigy), Darocur 1173 (2-hydroxy-2-methyl-1-phenylpropan-1-one as the active component, Ciba-Geigy), Irgacure 907 (2-methyl-1-[4-(methylthio)phenyl]-2-morpholino propan-1-one, Ciba-Geigy), Irgacure 369 (2-benzyl-2-dimethylamino-1-(4-morpholinophenyl)-butan-1-one as the active component, Ciba-Geigy), Esacure KIP 150 (poly{2-hydroxy-2-methyl-1-[4-(1-methylvinyl)phenyl]propan-1-one}, Fratelli Lamberti), Esacure KIP 100 F (blend of poly{2-hydroxy-2-methyl-1-[4-(1-methylvinyl)phenyl]propan-1-one} and 2-hydroxy-2-methyl-1-phenyl-propan-1-one, Fratelli Lamberti), Esacure KTO 46 (blend of poly{2-hydroxy-2-methyl-1-[4-(1-methylvinyl)phenyl]propan-1-one}, 2,4,6-trimethylbenzoyldiphenyl-phosphine oxide and methylbenzophenone derivatives, Fratelli Lamberti), acylphosphine oxides such as Lucirin TPO (2,4,6-trimethylbenzoyl diphenyl phosphine oxide, BASF), Irgacure 819 (bis(2,4,6-trimethylbenzoyl)-phenyl-phosphine-oxide, Ciba-Geigy), Irgacure 1700 (25:75% blend of bis(2,6-dimethoxybenzoyl)2,4,4-trimethyl-pentyl phosphine oxide and 2-hydroxy-2-methyl-1-phenyl-propan-1-one, Ciba-Geigy), and the like. Also mixtures of type I photoinitiators can be used.

The amount of the Norrish Type II photoinitiator in the coating formulation comprising the carrier liquid is preferably higher than 0.01 wt %, more preferably higher than 0.02 wt %, of that coating formulation. The amount of the Norrish Type II photoinitiator in the coating formulation comprising the carrier liquid is preferably lower than 0.5 wt %, more preferably lower than 0.2 wt %.

The amount of the Norrish Type II photoinitiator and, if present, the Norrish type I photoinitiator in the hydrophilic coating formulation is between 0.1 and 10 wt %, preferably between 0.5 and 5 wt %, most preferably between 0.5 and 3 wt % based on the total dry weight of the coating. The dry weight is defined as the weight comprising all components of the coating formulation excluding the carrier liquid.

Typically the weight ratio of Norrish Type I photoinitiator to the Norrish Type II photoinitiator is between 10:1 and 1:10; preferably between 7:1 and 1:7 and more preferably between 5:1 and 1:5; most preferably between 2:1 and 1:2.

The coating formulation further comprises a hydrophilic polymer. Herein a hydrophilic polymer is understood to be a high molecular weight linear, branched or cross-linked polymer composed of macromolecules. Hydrophilic polymers have an affinity for water or other polar liquids and as such do attract and/or absorb water when used in a coating on a surface.

The hydrophilic polymer is capable of providing hydrophilicity to a coating and may be synthetic or bio-derived. The hydrophilic polymer can be a blend of polymers or contain copolymers. The hydrophilic polymers include but are not limited to poly(lactams), for example polyvinylpyrrollidone (PVP), polyurethanes, homo- and copolymers of acrylic and methacrylic acid, polyvinyl alcohol, polyvinylethers, maleic anhydride based copolymers, polyesters, vinylamines, polyethyleneimines, polyethyleneoxides, poly(carboxylic acids), polyamides, polyanhydrides, polyphosphazenes, cellulosics, for example methyl cellulose, carboxymethyl cellulose, hydroxymethyl cellulose, and hydroxypropylcellulose, heparin, dextran, polypeptides, for example collagens, fibrins, and elastin, polysacharrides, for example chitosan, hyaluronic acid, alginates, gelatin, and chitin, polyesters, for example polylactides, polyglycolides, and polycaprolactones, polypeptides, for example collagen, albumin, oligo peptides, polypeptides, short chain peptides, proteins, and oligonucleotides.

Generally the hydrophilic polymer has a molecular weight in the range of about 8,000 to about 5,000,000 g/mol, preferably in the range of about 20,000 to about 3,000,000 g/mol and more preferably in the range of about 200,000 to about 2,000,000 g/mol.

The coating formulation comprising the carrier liquid generally comprises 2-10 wt %, preferably 3-8 wt %, of a hydrophilic polymer.

In a dry hydrophilic coating that is present on a substrate the hydrophilic polymer may be present in more than 1 wt %, for example more than 5 wt %, or more than 50 wt %, based on the total dry weight of the coating. The hydrophilic polymer can be present up to 99 wt %, or up to 95 wt %, based on the total dry weight of the coating.

The formulation further comprises a carrier liquid in a sufficient amount to disperse or dissolve the other components of the formulation. The carrier liquid concentration is at least 70 wt. %, preferably at least 75 wt. %, more preferably at least 80 wt. %, even more preferably at least 85 wt. % of the total weight of the coating formulation. In view of handling properties (low viscosity) and/or in order to facilitate the application of the composition such that a coating with the desired thickness is obtained, the amount of carrier liquid in the composition is preferably relatively high. For that reason the total solids content is preferably 20 wt. % or less.

The carrier liquid comprises water. The water may be the single solvent or a mixture with another solvent. The water content in the carrier liquid is normally chosen between 20 and 100 wt % based on the total amount of carrier liquid. Preferably the water content in the carrier liquid is between 20 and 80 wt %, more preferably between 40 and 60 wt %.

The carrier liquid(s) are chosen such that the polymers can be dissolved or at least dispersed therein. In particular for dissolving or dispersing the hydrophilic polymer well, it is preferred that the carrier liquid(s) are polar liquids. In particular, a liquid is considered polar if it is soluble in water. Apart from water, the carrier liquid preferably comprises an organic liquid soluble in water, more preferably an alcohol, most preferably a C1-C4 alcohol, in particular methanol and/or ethanol and/or isopropanol.

The hydrophilic coating formulation according to the invention may also comprise a polyelectrolyte. Herein a polyelectrolyte is understood to be a high molecular weight linear, branched or cross-linked polymer composed of macromolecules comprising constitutional units, in which between 5 and 100% of the constitutional units contain ionized groups when the polyelectrolyte is in the lubricious coating. Herein a constitutional unit is understood to be a repeating unit, for example a monomer. A polyelectrolyte herein may refer to one type of polyelectrolyte composed of one type of macromolecules, but it may also refer to two or more different types of polyelectrolytes composed of different types of macromolecules.

The use of a polyelectrolyte may be considered to improve the lubricity and the dry-out time of the hydrophilic coating. Herein dry-out time is defined as the duration that a hydrophilic coating remains lubricious in the open air after the device comprising the hydrophilic coating has been taken out of the wetting fluid wherein it has been stored and/or wetted. Hydrophilic coatings with an improved dry-out time, i.e. wherein the duration that the hydrophilic coating remains lubricious is longer, will have a lower tendency of losing water and drying out prior to insertion into the body, or in the body when it comes in contact with e.g. a mucous membrane or vein. When the dry-out time of a hydrophilic coating is low it may result in complications when the device comprising the lubricious coating is inserted into the body or removed from the body. The dry-out time can be determined in a Harland Friction Test (HFT) by measuring the friction in gram as a function of the time that the catheter is exposed to air.

Considerations when selecting a suitable polyelectrolyte are its solubility and viscosity in aqueous media, its molecular weight, its charge density, its affinity with the supporting network of the coating and its biocompatibility. Herein biocompatibility means biological compatibility by not producing a toxic, injurious or immunological response in living mammalian tissue.

To obtain a hydrophilic coating with a low amount of migrateables, the polyelectrolyte is preferably a polymer having a weight average molecular weight of at least about 1000 g/mol, as can be determined by light scattering, optionally in combination with size exclusion chromatography. A relatively high molecular weight polyelectrolyte is preferred for increasing the dry-out time and/or reduced migration out of the coating. The weight average molecular weight of the polyelectrolyte is preferably at least 20,000 g/mol, more preferably at least 100,000 g/mol, even more preferably at least about 150,000 g/mol, in particular about 200,000 g/mol or more. To be able to apply the coating easy it is preferred that the average weight is 1000,000 g/mol or less, in particular 500,000 g/mol or less, more in particular 300,000 g/mol or less.

Examples of ionized groups that may be present in the polyelectrolyte are ammonium groups, phosphonium groups, sulfonium groups, carboxylate groups, sulfate groups, sulfinic groups, sulfonic groups, phosphate groups, and phosphonic groups. Such groups are very effective in binding water. In one embodiment of the invention a polyelectrolyte is used that also comprises metal ions. Metal ions that may be present in the polyelectrolyte are for example alkali metal ions, such as $Na^+$, $Li^+$, or $K^+$, or alkaline earth metal ions, such as $Ca^{2+}$ and $Mg^{2+}$. In particular when the polyelectrolyte comprises quaternary amine salts, for example quaternary ammonium groups, anions may be present. Such anions can for example be halogenides, such as $Cl^-$, $Br^-$, $I^-$ and $F^-$, and also sulphates, nitrates, carbonates and phosphates.

Suitable polyelectrolytes are for example salts of homo- and co-polymers of acrylic acid, salts of homo- and co-polymers of methacrylic acid, salts of homo- and co-polymers of maleic acid, salts of homo- and co-polymers of fumaric acid, salts of homo- and co-polymers of monomers comprising sulfonic acid groups, homo- and co-polymers of monomers comprising quarternary ammonium salts and mixtures and/or derivatives thereof. Examples of suitable polyelectrolytes are poly(acrylamide-co-acrylic acid) salts, for example poly(acrylamide-co-acrylic acid) sodium salt, poly(acrylamide-co-methacrylic acid) salts, for example poly(acrylamide-co-methacrylic acid) sodium salt, poly(methacrylamide-co-acrylic acid) salts, for example poly(methacrylamide-co-acrylic acid) sodium salt, poly(methacrylamide-co-methacrylic acid) salts, for example poly(methacrylamide-co-methacrylic acid) sodium salt poly(acrylic acid) salts, for example poly(acrylic acid) sodium salt, poly(methacrylic acid) salts, for example poly(methacrylic acid) sodium salt, poly(acrylic acid-co-maleic acid) salts, for example poly(acrylic acid-co-maleic acid) sodium salt, poly(methacrylic acid-co-maleic acid) salts, for example poly(methacrylic acid-co-maleic acid) sodium salt, poly(acrylamide-co-maleic acid) salts, for example poly(acrylamide-co-maleic acid) sodium salt, poly(methacrylamide-co-maleic acid) salts, for example poly(methacrylamide-co-maleic acid) sodium salt, poly(acrylamido-2-methyl-1-propanesulfonic acid) salts, poly(4-styrene sulfonic acid) salts, poly(acrylamide-co-dialkyl ammonium chloride), quaternized poly[bis-(2-chloroethyl)ether-alt-1,3-bis[3-(dimethylamino)propyl]urea], polyallylammonium phosphate, poly(diallyldimethylammonium chloride), poly(sodium trimethyleneoxyethylene sulfonate), poly(dimethyldodecyl(2-acrylamidoethyl)ammonium bromide), poly(2-N methylpyridiniumethylene iodine), polyvinylsulfonic acids, and salts of poly(vinyl)pyridines, polyethyleneimines, and polylysines.

Particularly suitable polyelectrolytes for use in the current invention are copolymeric polyelectrolytes, which may be random or block copolymers, wherein said copolymeric polyelectrolyte is a copolymer comprising at least two different types of constitutional units, wherein at least one type of constitutional units comprises ionizable or ionized groups and at least one type of constitutional units is absent of ionizable or ionized groups. Herein "ionizable" is understood to be ionizable in neutral aqueous solutions, i.e. solutions having a pH between 6 and 8. An example of such a copolymeric polyelectrolyte is a poly(acrylamide-co-acrylic acid) salt.

In one embodiment of the invention the hydrophilic coating composition comprises between 0 and 90 wt %, preferably 10-20 wt % of polyelectrolyte based on the total dry weight of the coating.

In the hydrophilic coating formulation the weight ratio of the total weight of hydrophilic polymer to polyelectrolyte may, for example, vary between 1:99 and 99:1, such as between 5:95 and 95:5 or 50:50 and 95:5.

Herein a hydrophilic coating formulation refers to a liquid hydrophilic coating formulation, e.g. a solution or a dispersion comprising a liquid medium. Herein any liquid medium that allows application of the hydrophilic coating formulation on a surface would suffice. Examples of liquid media are alcohols, like methanol, ethanol, propanol, butanol or respective isomers and aqueous mixtures thereof, acetone, methylethyl ketone, tetrahydrofuran, dichloromethane, toluene, and aqueous mixtures or emulsions thereof or water.

The invention is also directed to a method of forming a hydrophilic coating on a substrate, the method comprising applying a coating formulation to at least one surface of the article and allowing the coating formulation to cure for a time period less than 360 seconds.

Preferably, the coating formulation is cured for a time period less than 240 seconds, more preferably for a time period less than 200 seconds. The hydrophilic coating formulation can be applied to the substrate by for example dip-coating. Other methods of application include spray, wash, vapor deposition, brush, roller and other methods known in the art.

The thickness of the hydrophilic coating according to the invention may be controlled by altering the soaking time, drawing speed, or viscosity of the hydrophilic coating formulation and the number of coating steps. Typically the thickness of a dry hydrophilic coating on a substrate ranges from 0.1-300 µm, preferably 0.5-100 µm, more preferably 1-30 µm, most preferably 1-15 µm.

The invention further relates to a method of forming on a substrate a hydrophilic coating which has a low coefficient of friction when wetted with a water-based liquid.

To apply the hydrophilic coating on the substrate, a primer coating may be used in order to provide a binding between the hydrophilic coating and the substrate. The primer coating is often referred to as the primary coating, base coat or tie coat. Said primer coating is a coating that facilitates adhesion of the hydrophilic coating to a given substrate. The binding between the primer coating and the hydrophilic coating may occur due to covalent or ionic links, hydrogen bonding, physisorption or polymer entanglements. These primer coatings may be solvent based, water based (latexes or emulsions) or solvent free and may comprise linear, branched and/or cross-linked components. Typical primer coatings that could be used comprise for example polyether sulfones, polyurethanes, polyesters, including polyacrylates, as described in for example U.S. Pat. No. 6,287,285, polyamides, polyethers, polyolefins and copolymers of the mentioned polymers.

In particular, the primer coating comprises a supporting polymer network, the supporting network optionally comprising a functional hydrophilic polymer entangled in the supporting polymer network as described in WO2006/056482 A1.

A primer coating as described above is in particular useful for improving adherence of a coating comprising a hydrophilic polymer such as a polylactam, in particular PVP and/or another of the above identified hydrophilic polymers, in particular on polyvinylchloride (PVC), silicone, polyamide, polyester, polyolefin, such as polyethylene, polypropylene and ethylene-propylene rubber (e.g. EPDM), or a surface having about the same or a lower hydrophilicity.

In general there is no restriction as to the thickness of the primer coating, but typically the thickness is less than 5 µm, preferably less than 2 µm or, more preferably less than 1 µm.

In an embodiment, the surface of the article is subjected to oxidative, photo-oxidative and/or polarizing surface treatment, for example plasma and/or corona treatment in order to improve the adherence of the coating which is to be provided. Suitable conditions are known in the art.

Curing herein is understood to refer to physical or chemical hardening or solidifying by any method, for example heating, cooling, drying, crystallization or curing as a result of a chemical reaction, such as radiation-curing or heat-curing. In the cured state all or part of the components in the hydrophilic coating formulation may be cross-linked forming covalent linkages between all or part of the components, for example by using UV or electron beam radiation. However, in the cured state all or part of the components may also be ionically bonded, bonded by dipole-dipole type interactions, or bonded via Van der Waals forces or hydrogen bonds.

The term "to cure" includes any way of treating the formulation such that it forms a firm or solid coating. In particular, the term includes a treatment whereby the hydrophilic polymer further polymerizes, is provided with grafts such that it forms a graft polymer and/or is cross-linked, such that it forms a cross-linked polymer.

Preferably, curing is performed by exposing the coating formulation to electromagnetic radiation, more preferably to UV radiation.

Intensity and wavelength of the electromagnetic radiation can routinely be chosen based on the photoinitiator of choice. In particular, a suitable wavelength in the UV, visible or IR part of the spectrum may be used.

The invention also relates to a hydrophilic coating obtainable by applying the hydrophilic coating formulation according to the invention to a substrate and curing it. The invention further relates to a lubricious coating obtainable by applying a wetting fluid to said hydrophilic coating. Further the invention relates to an article, in particular a medical device or a medical device component comprising at least one hydrophilic coating according to the invention.

The hydrophilic coating comprises a hydrophilic polymer. Said hydrophilic coating is formed by curing a hydrophilic coating formulation comprising the hydrophilic polymer, the Norrish Type II photoinitiator and, optionally, the Norrish Type I photoinitiator. If a polyelectrolyte is present this may also be covalently linked and/or physically bound to one or more of the other components and/or entrapped to form a polymer network after curing.

The fact that the hydrophilic polymer and/or polyelectrolyte are covalently and/or physically bound in the hydrophilic coating as part of a polymer network has the advantage that they will not leak out into the environment of the hydrophilic coating, for example when it is coated on a medical device. This is particularly useful when the medical device is inside the human or animal body.

The hydrophilic coating can also comprise other additives, such as, supporting polymers, antimicrobial additives, pigments, coloring agents, surfactants and plasticizers.

The hydrophilic coating according to the invention can be coated on an article. The hydrophilic coating can be coated on a substrate which may be selected from a range of geometries and materials. The substrate may have a texture, such as porous, non-porous, smooth, rough, even or uneven. The substrate supports the hydrophilic coating on its surface. The hydrophilic coating can be on all areas of the substrate or on selected areas. The hydrophilic coating can be applied to a variety of physical forms, including films, sheets, rods, tubes, molded parts (regular or irregular shape), fibers, fabrics, and particulates. Suitable surfaces for use in the invention are surfaces that provide the desired properties such as porosity, hydrophobicity, hydrophilicity, colorisability, strength, flexibility, permeability, elongation abrasion resistance and tear resistance. Examples of suitable surfaces are for instance surfaces that consist of or comprise metals, plastics, ceramics, glass and/or composites. The hydrophilic coating may be applied directly to the said surfaces or may be applied to a pretreated or coated surface where the pretreatment or coating is designed to aid adhesion of the hydrophilic coating to the substrate.

In one embodiment of the invention the hydrophilic coating according to the invention is coated on a biomedical substrate. A biomedical substrate refers, in part, to the fields of medicine, and the study of living cells and systems. These fields include diagnostic, therapeutic, and experimental human medicine, veterinary medicine, and agriculture. Examples of medical fields include ophthalmology, orthopedics, and prosthetics, immunology, dermatology, pharmacology, and surgery; non-limiting examples of research fields include cell biology, microbiology, and chemistry. The term "biomedical" also relates to chemicals and compositions of chemicals, regardless of their source, that (i) mediate a biological response in vivo, (ii) are active in an in vitro assay or other model, e.g., an immunological or pharmacological assay, or (iii) can be found within a cell or organism. The term "biomedical" also refers to the separation sciences, such as those involving processes of chromatography, osmosis, reverse osmosis, and filtration. Examples of biomedical articles include research tools, industrial, and consumer applications. Biomedical articles include separation articles, implantable articles, and ophthalmic articles. Ophthalmic articles include soft and hard contact lenses, intraocular lenses, and forceps, retractors, or other surgical tools that contact the eye or surrounding tissue. A preferred biomedical article is a soft contact lens made of a silicon-containing hydrogel polymer that is highly permeable to oxygen. Separation articles include filters, osmosis and reverse osmosis membranes, and dialysis membranes, as well as bio-surfaces such as artificial skins or other membranes. Implantable articles include catheters, and segments of artificial bone, joints, or cartilage. An article may be in more than one category, for example, an artificial skin is a porous, biomedical article. Examples of cell culture articles are glass beakers, plastic petri dishes, and other implements used in tissue cell culture or cell culture processes. A preferred example of a cell culture article is a bioreactor micro-carrier, a silicone polymer matrix used in immobilized cell bioreactors, where the geometry, porosity, and density of the particulate micro-carrier may be controlled to optimize performance. Ideally, the micro-carrier is resistant to chemical or biological degradation, to high impact stress, to mechanical stress (stirring), and to repeated steam or chemical sterilization. In addition to silicone polymers, other materials may also be suitable. This invention may also be applied in the food industry, the paper printing industry, hospital supplies, diapers and other liners, and other areas where hydrophilic, wettable, or wicking articles are desired.

The medical device can be an implantable device or an extracorporeal device. The devices can be of short-term temporary use or of long-term permanent implantation. In certain embodiments, suitable devices are those that are typically used to provide for medical therapy and/or diagnostics in heart rhythm disorders, heart failure, valve disease, vascular disease, diabetes, neurological diseases and disorders, orthopedics, neurosurgery, oncology, ophthalmology, and ENT surgery.

Suitable examples of medical devices include, but are not limited to, a stent, stent graft, anastomotic connector, synthetic patch, lead, electrode, needle, guide wire, catheter, sensor, surgical instrument, angioplasty balloon, wound drain, shunt, tubing, infusion sleeve, urethral insert, pellet, implant, blood oxygenator, pump, vascular graft, vascular access port, heart valve, annuloplasty ring, suture, surgical clip, surgical staple, pacemaker, implantable defibrillator, neurostimulator, orthopedic device, cerebrospinal fluid shunt, implantable drug pump, spinal cage, artificial disc, replacement device for nucleus pulposus, ear tube, intraocular lens and any tubing used in minimally invasive surgery.

Articles that are particularly suited to be used in the present invention include medical devices or components such as catheters, for example intermittent catheters, balloon catheters, PTCP catheters, stent delivery catheters, guide wires, stents, syringes, metal and plastic implants, contact lenses and medical tubing.

The invention will be further illustrated by the following examples, without being limited thereto.

EXAMPLES I-V AND COMPARATIVE EXPERIMENTS A-C

Primer Coating Formulation

The primer formulation was prepared by dissolving the components below in ethanol.

| | |
|---|---|
| PTGL1000 (T-H)$_2$ oligomer | 4.25% (w/w) |
| PVP K85 (supplied by BASF) | 0.75% (w/w) |
| Irgacure 2959 (supplied by Sigma Aldrich) | 0.20% (w/w) |
| Ethanol 96% (supplied by Merck) | 94.8% (w/w) |

The synthesis of PTGL1000(T-H)$_2$ oligomer is described in WO2007/065722.

Hydrophilic Coating Formulation

The hydrophilic coating formulation was prepared by dissolving the components below in a water/ethanol mixture 1:1 based on weight.

| | Weight % |
|---|---|
| PVP K85 | 5.2 |
| Polyacrylamide-co-acrylic acid sodium salt (PAcA) (supplied by Sigma Aldrich) | 0.35 |
| Irgacure 2959 (supplied by Sigma Aldrich) | variable (see table 1 below) |
| Norrish Type II photoinitiator | variable (see table 1 below) |
| Ethanol (96%) | 49 |
| Water | 45 |

TABLE 1

Composition hydrophilic top coatings in weight % based on dry weight of the coating

| Example/Experiment | A | B | C | I | II | III | IV | V |
|---|---|---|---|---|---|---|---|---|
| Irgacure 2959 | 3 | 0 | 1 | 0 | 0 | 0 | 1 | 1 |
| Benzophenone | 0 | 2 | 1 | 0 | 0 | 0 | 0 | 0 |
| 3-benzoyl benzoic acid | 0 | 0 | 0 | 2 | 0 | 0 | 1 | 0 |
| 4-benzoyl benzoic acid | 0 | 0 | 0 | 0 | 2 | 0 | 0 | 0 |
| 3,3',4,4'-benzophenone Tetracarboxylic acid anhydride | 0 | 0 | 0 | 0 | 0 | 2 | 0 | 1 |

Coating Application

PVC tubes, supplied by Raumedic, with a diameter of 14 Fr and a length of 40 cm were coated on a Harland PCX coater 175/24.

The PVC tubes were first dip-coated with the primer coating formulation and cured according the dip protocol for the primer in table 2. Subsequently the hydrophilic coating formulation was applied and cured according the dip protocol for the hydrophilic coating. Temperature and humidity during application were respectively 21° C.+/−2° C. and 40%+/−15%.

The Harland PCX coater/175/24 was equipped with a Harland Medical systems UVM 400 lamp. Intensity of the lamps of the Harland PCX coater/175/24 was on average 60 mW/cm$^2$ and was measured using a Solatell Sola Sensor 1 equipped with an International Light detector SED005#989, Input Optic: W#11521, filter: wbs320#27794. The IL1400A instruction manual of International Light was applied, which is available on the internet: www.intl-light.com. For the applied parameters in the PCX coater see Table 2.

TABLE 2

Applied parameters in the PCX Coater
Coating parameters selection table

| Dipping Cycle | Primer coating | Hydrophilic coating |
|---|---|---|
| Move device carrier to position (cm) | 125 | 125 |
| Speed (cm/sec) | 6.5 | 6.5 |
| accelaration (sec) | 0.1 | 0.1 |
| Move device carrier down (cm) | 11.5 | 11.5 |
| speed (cm/sec) | 4 | 2 |
| accelaration (sec) | 0.1 | 0.1 |
| Move device carrier down (cm) | 27.5 | 27.5 |
| speed (cm/sec) | 2 | 2 |
| accelaration (sec) | 0.1 | 0.1 |
| Time Pause (sec) | 10 | 10 |
| Move device carrier up (cm) | 28.5 | 28.5 |
| speed (cm/sec) | 0.3 | 1.5 |
| accelaration (sec) | 0.1 | 0.1 |
| Move device carrier to position (cm) | 148 | 148 |
| speed (cm/sec) | 6.5 | 6.5 |
| accelaration (sec) | 0.1 | 0.1 |
| Cure Cycle | | |
| Rotator On (rpm) | 2 | 2 |
| UV lights Full Power | | |
| Drying time (sec) | 90 | 90 |
| Time pause (sec) | 30 | Varied: 180, 240 or 360 |
| Close Shutter | | |
| UV lights Standby Power | | |
| Rotator Off | | |

Test Methods

Lubricity Test

Lubricity tests were performed on a Harland FTS5000 Friction Tester (HFT). The protocol was selected: see Table 3 for HFT settings. Friction tester pads were used from Harland Medical Systems, P/N 102692, FTS5000 Friction Tester Pads, 0,125*0,5**0,125, 60 durometer.

Subsequently the desired test description was inserted when "run test" was activated. After inserting the guidewire into the catheter, the catheter was attached in the holder. The device was jogged down to the desired position and the catheter was soaked in demineralized water for 1 min. After zero gauging in water the protocol was activated by pushing "start". The data were saved after finishing. The holder was removed from the force gauge and subsequently the catheter was removed from the holder.

TABLE 3

| HFT settings | |
|---|---|
| Transport movement (cm) | 10 |
| Clamp force (g) | 300 |
| Pull speed (cm/s) | 1 |
| Acceleration time (s) | 2 |
| Number of rubs | 25 |

The measured coefficient of friction (COF) after 25 rubs is used to rate performance of the coating. The COF is defined as the measured friction/clamp force.

A COF<0.05 is judged as good. A COF between 0.05 and 0.1 is judged as too high; a COF>0.1 is judged as bad.

Feel Test

The coating was also evaluated after being wetted by rubbing gently with the fingers. A coating that is insufficiently cured releases a lot of sticky material and defects are easily induced.

Rating in the Feel Test

Good: no leachables, no defects induced after rubbing or HFT test

Reasonable some leachables indicated as slight sticky feeling, few defects that are difficult to be felt Bad: clear sticky feeling, defects clearly felt as area's where coating is rubbed away or damaged Very bad: fingers are covered with a sticky mass, many severe defects (most severe case is that the coating integrity is so bad that the coating dissolves in water)

Experimental Results

TABLE 4

Performance of coatings
produced with a cure time of 240 s for the top coat.

| Formulation | COF | Feel test |
|---|---|---|
| A | >0.1 | Very bad |
| B | >0.1 | Very bad |
| C | >0.1 | Very bad |
| I | 0.03 | Good |
| II | 0.03 | Good |
| III | 0.03 | Good |
| IV | 0.03 | Good |
| V | 0.03 | Good |

TABLE 5

Performance of coatings
produced with a cure time of 180 s for the top coat.

| Formulation | COF | Feel test |
|---|---|---|
| A | >0.1 | Very bad |
| B | >0.1 | Very bad |
| C | >0.1 | Very bad |
| I | >0.1 | Very bad |
| II | >0.1 | Very bad |
| IV | 0.03 | Reasonable |
| V | 0.03 | Good |

The invention claimed is:

1. A coating formulation for preparing a hydrophilic coating comprising:
    (a) a hydrophilic polymer,
    (b) a polyelectrolyte,
    (c) a Norrish Type II photoinitiator, comprising a substituted benzophenone, xanthone, thioxanthone or anthraquinone, and
    (d) more than 70 wt % of a carrier liquid, the carrier liquid comprising 20-80 wt % of water based on total amount of carrier liquid.

2. The coating formulation according to claim 1, wherein the Norrish Type II photoinitiator comprises one or more substituents on the 3 and/or 4 position of the phenyl rings.

3. The coating formulation according to claim 1, wherein the Norrish Type II photoinitiator is chosen from the group consisting of 2-benzoyl benzoic acid, 3-benzoyl benzoic acid, 4-benzoyl benzoic acid, 3,3',4,4'-benzophenone tetracarboxilic acid, 4-benzoyl-N,N,N,-trimethylbenzene-methaminium chloride, 2-hydroxy-3-(4-benzoylphenoxy)-N,N,N-trimethyl-1-propanaminium chloride, 2-hydroxy-3-(3,4-dimethyl-9-oxo-9H-thioxanthon-2-yloxy)-N,N,N-trimethyl-1-propanaminium chloride, thioxanthone-3-carboxylic acid, thioxanthone-4-carboxylic acid, anthraquinone 2-sulfonic acid, 9,10-anthraquinone-2,6-disulphonic acid, anthraquinone-2-sulfonic acid, anthraquinone-2-carboxylic acid and salts of these photoinitiators.

4. The coating formulation according to claim 1, wherein the hydrophilic polymer is selected from the group consisting of poly(lactams), polyvinylpyrollidone (PVP), polyurethanes, homo- and copolymers of acrylic and methacrylic acid, polyvinyl alcohol, polyvinylethers, maleic anhydride based copolymers, polyesters, vinylamines, polyethyleneimines, polyethyleneoxides, poly(carboxylic acids), polyamides, polyanhydrides, polyphosphazenes, cellulosics, methyl cellulose, carboxymethyl cellulose, hydroxymethyl cellulose, hydroxypropylcellulose, heparin, dextran, polypeptides, collagens, fibrins, elastin, polysachamides, chitosan, hyaluronic acid, alginates, gelatin, chitin, polyesters, polylactides, polyglycolides, polycaprolactones, polypeptides, albumin, oligo peptides, proteins, oligonucleotides and blends or copolymers hereof.

5. The coating formulation according to claim 1, wherein the coating formulation also comprises a Norrish Type I photoinitiator.

6. The coating formulation according to claim 5, wherein the Norrish Type I photoinitiator is chosen from the group consisting of benzoin derivatives, methylolbenzoin and 4-benzoyl-1,3-dioxolane derivatives, benzilketals, α,α-dialkoxyacetophenones, α-hydroxy alkylphenones, α-aminoalkylphenones, acylphosphine oxides, bisacylphosphine oxides, acylphosphine sulphides, and halogenated acetophenone derivatives.

7. A hydrophilic coating obtained by curing a hydrophilic coating formulation according to claim 1.

8. A lubricious coating obtained by applying a wetting fluid to the hydrophilic coating according to claim 7.

9. An article comprising at least one lubricious coating according to claim 8.

10. An article comprising at least one hydrophilic coating according to claim 7.

11. The article according to claim 10, wherein the article is a medical device or component.

12. The article according to claim 11, wherein the medical device or component comprises a catheter, a medical tubing, a guide wire, a stent, or a membrane.

13. A method of forming a hydrophilic coating on a substrate, the method comprising:
(i) applying a coating formulation according to claim 1 to at least one surface of an article; and
(ii) allowing the coating formulation to cure for a time period less than 360 seconds.

14. The method according to claim 13, wherein curing is performed by exposing the formulation to electromagnetic radiation, preferably to UV radiation.

* * * * *